(12) United States Patent
Muthukkaruppan et al.

(10) Patent No.: US 6,275,830 B1
(45) Date of Patent: Aug. 14, 2001

(54) COMPILE TIME VARIABLE SIZE PAGING OF CONSTANT POOLS

(75) Inventors: Kannan Muthukkaruppan; Murali Vemulapati, both of Foster City; Shirish Puranik, Fremont, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/044,507

(22) Filed: Mar. 18, 1998

(51) Int. Cl.[7] .................................................. G06F 17/30
(52) U.S. Cl. ................................... 707/200; 707/205
(58) Field of Search .................................. 707/205, 200, 707/203, 204

(56) References Cited

U.S. PATENT DOCUMENTS

| | | | |
|---|---|---|---|
| 5,418,949 | * | 5/1995 | Suzuki ................................. 707/205 |
| 5,675,790 | * | 10/1997 | Walls ................................... 707/205 |
| 5,721,858 | * | 2/1998 | White et al. ......................... 711/203 |
| 5,784,698 | * | 7/1998 | Brady et al. ......................... 711/171 |
| 5,784,699 | * | 7/1998 | McMahon et al. .................. 711/171 |
| 5,784,707 | * | 7/1998 | Khalidi et al. ...................... 711/206 |
| 5,838,980 | * | 11/1998 | Guillen et al. ...................... 395/708 |
| 5,897,661 | * | 4/1999 | Baranovsky et al. ............... 711/170 |
| 5,974,424 | * | 10/1999 | Schmuck et al. .................... 707/201 |

* cited by examiner

*Primary Examiner*—Hosain T. Alam
*Assistant Examiner*—Jean Bolte Fleurantin
(74) *Attorney, Agent, or Firm*—Hickman Palermo Truong & Becker, LLP; Marcel K. Bingham

(57) ABSTRACT

A method and apparatus for paging data in a computer system is provided. A set of data associated with a program unit is divided into pages such that no item of the set of data spans more than one page. The size of one page may vary from the size of another. When the program unit is compiled, metadata is generated that indicates the division of items into pages. At load time, a page mapping is generated based on the metadata. The page mapping is used to locate a item that belongs to the set of data. Other parts of the program unit, such as byte code, can contain references to items in the constant pool. Each reference specifies the number of the page in which the corresponding item will be stored at runtime, and the offset of that item within the page.

40 Claims, 8 Drawing Sheets

Table of Constants 370

| String | Size | |
|---|---|---|
| "First String" | 13 Bytes | ⎫ |
| o | | |
| o | | page number 0 |
| o | | |
| o | | ⎭ |
| "Another String" | 15 Bytes | } page number 1 |
| "Last String..." | 5 Kbytes | } page number 2 |

372 — "First String" row
374 — "Another String" row
376 — "Last String..." row

*Fig. 3B*

COMPILE TIME VARIABLE SIZE PAGING OF CONSTANT POOLS

FIELD OF THE INVENTION

The present invention relates to the paging of data in a computer system, and in particular, to dividing data associated with a program unit into variable size pages based on metadata generated during the compilation of the program unit.

BACKGROUND OF THE INVENTION

Under certain conditions, it is desirable to allow multiple concurrent processes to have shared access to a group of shared memory structures. For example, a database server may be implemented by numerous processes, where many of the processes require shared access to data located in a memory associated with the database server. Typically the memory area that contains the shared data of the database server is allocated by an operating system as a logically contiguous region. The shared memory area is not necessarily a physically contiguous region, but rather represents a contiguous range of virtual memory address space. The contiguous range of virtual address space may include one or more noncontiguous regions of physical memory.

For a database server, the items stored in the shared memory area typically include parse trees and execution plans for individual queries, and compiled byte code and constant pools for stored program units that can be executed by server processes. Such programs may be, for example, PL/SQL™ programs which have been compiled into byte code that is interpreted by a PL/SQL™ interpreter. PL/SQL™ is a procedural database language available from Oracle Corporation.

Currently, whenever an item needs to be stored in the shared memory area, the item is preferably allocated an unused contiguous area in the shared memory area that is large enough to hold the entire item. To make an area of the required size available when an unused area of the required size is not available, one or more items currently residing in the shared memory area are removed. Over time, as items are stored in the shared memory area and removed to be replaced by other items, the shared memory area address space becomes fragmented, i.e. contains many small non-contiguous unused areas, as opposed to a few large unused areas.

Fragmentation of the shared memory area is a serious problem. It increases the likelihood that whenever a new item is stored in the shared memory area, one or more items currently in the shared memory area are removed, despite the fact that in total, the unused area in the shared memory area address space might have been large enough to accommodate the newly stored item.

Consequently, fragmentation adversely impacts performance. Fragmentation causes old items to be removed from the shared memory area to make room for new items, where the old items would not have to have been removed if the shared memory area was not fragmented. Having removed the old items from the shared memory area, additional overhead is expended to retrieve the old items from disk when subsequently required by server processes.

In addition to increasing the frequency of disk access, fragmentation may significantly increase the workload of a server process. For example, one or more users might repeatedly issue the same particular SQL statement. The first time the statement is executed, it is parsed and optimized, and the resulting parse tree and execution plan are stored in the shared memory area, where they remain available for subsequent executions of the statement. Fragmentation may cause these items to be removed from the shared memory area sooner than would be necessary if the shared memory area were less fragmented. After these items have been removed from the shared memory area, the statement must be parsed and optimized again the next time it is received.

One technique for lessening the performance impact of fragmentation of the shared memory area is the "paging" technique. Paging involves dividing items that are to be loaded in the shared memory area into blocks called pages. Each of the pages can be loaded into a different area of the shared memory area, that, without paging, is individually too small to be used to allocate to store the entire item. Paging thus reduces the frequency at which items are removed from the shared memory area.

One approach for paging is the "uniform-page-size" approach. In the uniform-page-size approach, uniformly sized pages of an item are loaded into free space within the shared memory area at runtime. The memory area into which a given page of the item is loaded is contiguous, but the memory areas that hold the various pages of a given item may not be contiguous with respect to each other.

In a shared memory area within a virtual memory address space, it is possible that a page may be stored in a contiguous range of virtual memory but be split between multiple physical regions of memory. Such splitting of pages between physical regions of memory is invisible to applications that only "see" virtual memory and is an issue that is addressed by the operating system.

The uniform-page-size approach works well for items that can be easily divided into equal sized pages without splitting individual components within the items. For example, byte code of a stored PL/SQL program unit includes byte code instructions for one or more routines. Because the byte code instructions are relatively small, the byte code module can easily be divided into equal sized pages without splitting a byte code instruction between pages.

The uniform-page size approach does not work well for items that contain large sub-items, or where there is a large variation in the sizes of sub-items. For example, one of the items that is loaded into the shared memory area when a PL/SQL® program is executed is the constant pool associated with the unit. A constant pool is a set of data structures containing data that remains fixed throughout the execution of a program unit. Constant pools may contain, among other things: string constants, information for exception handlers, data type descriptors for PL/SQL™ data types, and PL/SQL function call descriptors (metadata describing a called function). For example, a constant pool for a program that prints text, named PrintText, may contain a function descriptor describing an invocation of the function 'print'. The function descriptors are then followed by a set of constant strings, which represent the text to print.

Sometimes, the string constants contained in a constant pool are too large to fit into a page. When this occurs, the string constant must be split between two pages. Unfortunately, when it is possible for portions of a sub-item, such as a PL/SQL™ string, to be stored at two non-contiguous regions of the shared memory area, the overhead associated with accessing the item is significantly increased. Specifically, the split sub-items must be reconstructed when they are accessed by a process.

For example, assume the constant pool associated with PrintText contains a string, boilerPlate, representing boilerplate text for a purchase order, and that the string size is 4.5 kbytes. The size of a data structure, as used herein, indicates the amount of computer memory required to store the data structure. Further assume that the size of the page is 4 kbytes. The string boilerPlate, being bigger than 4 kbytes, must be split between two pages. Typically, when a process accesses a string, the string must be presented as one contiguous stream of characters that ends with a terminating character. In order to make the string appear in this manner, the string is reconstructed by combining the split portions and storing them together, temporarily, in a separate contiguous area of memory. Reconstructing a string thus requires operations for allocating a contiguous area memory, accessing the split portions, combining and storing them in the allocated contiguous area of memory, and then de-allocating the memory. Performing these operations causes an undesirable level of overhead.

Based on the foregoing, it would be highly desirable to provide a method of paging which avoids the inefficiency inherent in splitting sub-items between pages.

SUMMARY OF THE INVENTION

A method and apparatus for paging data in a computer system is described. According to one aspect of the invention, a set of data associated with a program unit is divided into pages such that no item of the set of data spans more than one page. The size of one page may vary from the size of another. When the program unit is compiled, metadata is generated that indicates the division of items into pages. At runtime, a page mapping is generated based on the metadata. The page mapping is used to locate a item that belongs to the set of data.

According to another aspect of the invention, items are assigned to pages until assigning a particular item would cause the page to exceed a base size, in which case the particular item is assigned to the next page. If the particular item exceeds a base size, the particular item is assigned to a page that is larger than the base size, and the item occupies the entire page.

According to another aspect of the invention, the metadata that is generated includes division size records. Each division size record is associated with a page and contains data indicating an amount of memory to allocate to the page associated with the division record. References to items can include data identifying the particular page in which the referred-to item is stored, and the particular location within the particular page at which the item is stored.

According to another aspect of the invention, the page mapping that is generated at runtime includes page mapping records. A page mapping record is associated with a page and contains data indicating the storage location of the page. A reference to a item in the page includes a page number associated with the page and offset which indicates the storage location of the item within the page.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B is a block diagram showing an exemplary table of constants having strings that may be contained in a constant pool;

DETAILED DESCRIPTION OF THE PREFERRED EMBODIMENT

A method and apparatus for the paging of data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
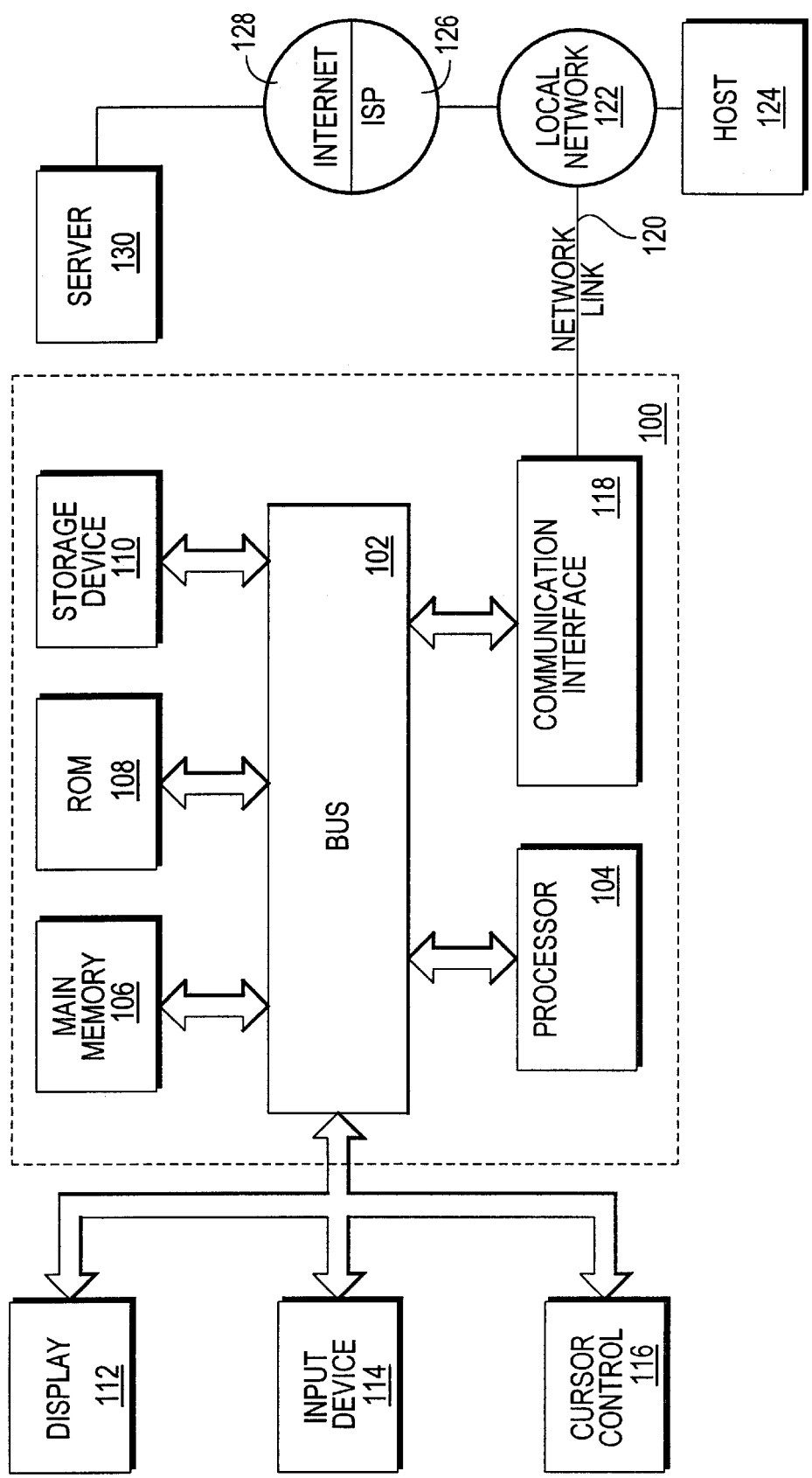
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for paging data. According to one embodiment of the invention, the paging of data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for paging within a shared memory area, as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

According to one aspect of the invention, when a program unit is compiled, page division metadata is generated for the constant pool of the program unit. The page division metadata specifies page boundaries between items within the constant pool. The page boundaries are specified in a manner such that no item in the constant pool spans more than one page. These boundaries determine the pages into which the items within the constant pool are loaded during runtime.

Other parts of the program unit, such as byte code, can contain references to items in the constant pool. These references are represented in a two tuple format. Specifically, the first tuple of each reference refers to the number of the page in which the corresponding item will be stored at runtime, and the second tuple refers to the offset of that item within the page.

When the program unit is loaded, the page division metadata is used to create the paged constant pool layout in memory. Page mapping information is generated to indicate the storage location of the pages in memory. The pages may vary in size.

Determining the boundaries between variable size pages at compile time offers several advantages. First, no item spans more than one page. Furthermore, because the size of a page may vary, the page size may be extended as needed to completely store a large item in one page. Thus, this approach avoids the overhead incurred as a result of splitting items between pages (i.e., overhead of reconstructing at runtime an item that is not stored in one continuous area of virtual memory). In addition, much of the work required to determine the division of a set of data into pages is performed at compile time rather than runtime. This allows program units to run more efficiently at runtime, when performance is more critical.

EXEMPLARY CODE COMPILER/EXECUTOR

Figure 2:
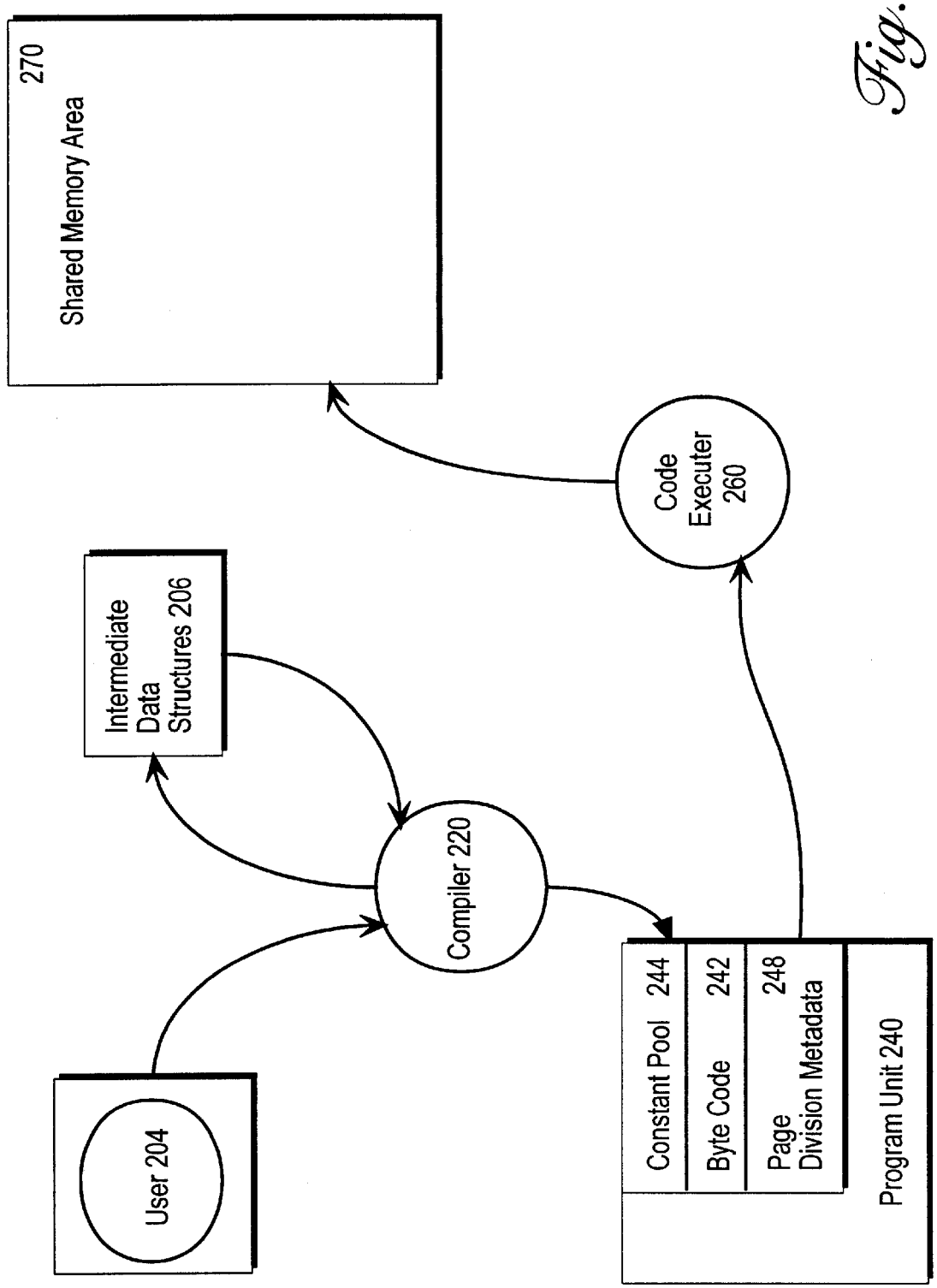
FIG. 2 is a block diagram depicting an exemplary compiler, a code executor, a user, a shared memory area, intermediate data structures used by the exemplary code executor, and a program unit.

Referring to FIG. 2, it is a block diagram that includes a compiler 220 configured according to an embodiment of the invention. Compiler 220 generates program unit 240 from user input 204. A program unit includes one or more routines (e.g. procedures or functions), instructions for executing the routines, and data related to the execution of the routines, such as data in a constant pool. User input may be in the form of, for example, statements read from a source file, or statements received from a GUI oriented interface in response to user interaction with the interface. Program unit 240 includes constant pool 244, page division metadata 248, and byte code 242 representing instructions for executing one or more routines specified by user input 204.

When generating program unit 240, compiler 220 generates and uses intermediate data structures 206, such as expression trees, parse trees, and intermediate byte code. Intermediate byte code is a set of instructions requiring further modification by compiler 220 before it may be executed by code executor 260 as byte code. For example, intermediate byte code may be lacking the reference data needed to locate certain data structures (e.g. constants) or routines.

Code executor 260 is software that executes byte code from program units. Before code executor 260 executes byte code from program unit 240, code executor 260 loads byte code 242, constant pool 244, and other data from program unit 240 into shared memory area 270. One example of a code executor is a PL/SQL™ interpretive engine. Byte code executed by the PL/SQL™ interpretive engine is compiled by a PL/SQL™ code compiler based on user input written in the PL/SQL™ computer language.

DATA STRUCTURES FOR GENERATING PAGE DIVISION METADATA

Figure 3A:
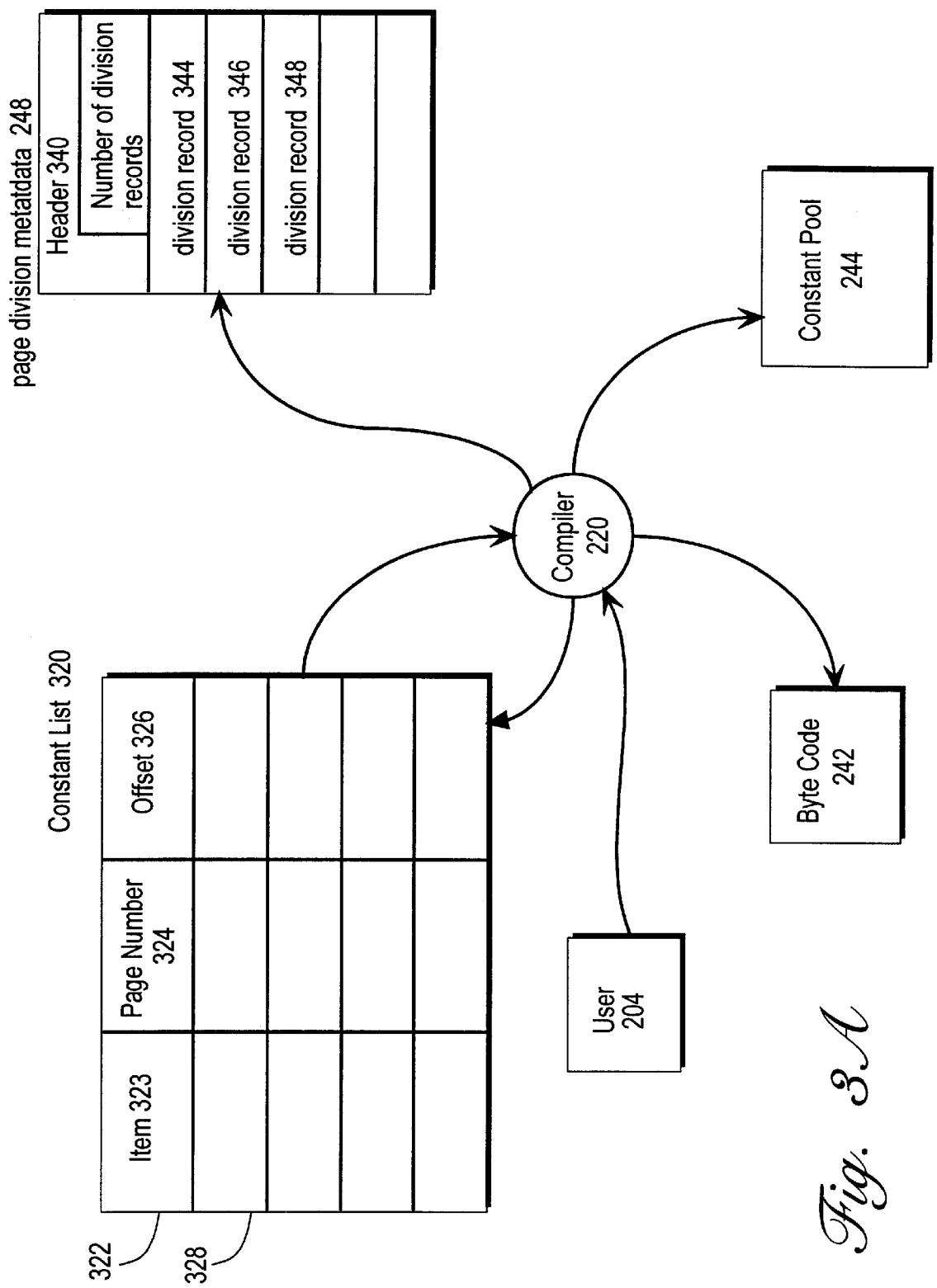
FIG. 3A is a block diagram depicting an exemplary compiler, constant list, page division metadata, and other data structures involved in generating page division metadata.

FIG. 3A shows a constant list 320. Constant list 320 is an intermediate data structure used by byte code compiler 220 to generate portions of program unit 240, including page metadata. Constant list 320 contains a record, such as constant list record 322, for each item in constant pool 244. Constant list record 322 includes an item field 323 that contains data that identifies an item, and two other fields: page number field 324 and offset field 326. Page number field 324 is a field that contains the number of the page in which the item associated with record 322 is stored at runtime. Offset field 326 is a field that contains data indicating where in the page the respective item is stored.

In one embodiment of the invention, the value in the offset field 326 specifies the number of bytes between the beginning of the page in which the respective item is stored and the beginning of the item within the page. For example, assume that an item "any string" is stored beginning at the eleventh byte after the beginning of the page associated with page number 0. The offset for "any string" would be ten.

While one mechanism for indicating the location within a page where the item is stored has been described, alternatives are possible. Therefore, it is understood that the present invention is not limited to any particular mechanism for indicating the location within a page at which an item is stored.

PAGE DIVISION METADATA

Page division metadata 248 (FIG. 3A) includes a page metadata header 340 and a sequence of one or more division records, such as division records 344, 346 and 348. Page metadata header 340 contains data indicating the number of division records in page division metadata 248.

Each division record is associated with a page, and includes the page number of the page, and a division size. The page number may be implicitly included in a division record by adopting the rule that the page number corresponds to the sequential position of the division record within the sequence of one or more division records. For example, the division record 344 (FIG. 3A), having a sequential position of one, is associated with a page number zero, and division record 346, having a sequential position of two, is associated with page number one.

The division size indicated by a division record is the amount of data from the constant pool to store in the page associated with the respective division record. The amount of data to store in a page dictates the amount of memory needed by a page that will store the data. Thus, the division size indicates the size of a page.

The page division metadata 248 is organized so that when data is read from the constant pool 244 and stored in pages in the order indicated by the sequence of division records and in the amount indicated by the respective division sizes, no item of the constant pool 244 is truncated or is contained in more than one page. Thus, page division metadata 248 indicates the division of the constant pool 244 into pages.

For example, the table of constants 370 shown in FIG. 3B shows exemplary contents of constant pool 244. String 372, string 374, and string 376 are null terminated strings (the null terminating character is not shown). Other strings between strings 372 and 374 are not shown. The size of each string is indicated in the "size" column to the right of the string.

For illustrative purposes, it shall be assumed that division record 344 represents a page that contains string 372 and all the strings in between string 372 and string 374 (not including string 374). The cumulative size of these strings is 4090 bytes. The next record, division record 346, represents a page that contains string 374, which has a size of 15 bytes. Finally, division record 348 represents a page that contains string 376, which has a size of 5120 bytes. Thus the division size values stored in division records 344, 346 and 348 are 4090 bytes, 15 bytes, and 5120 bytes, respectively.

RUNTIME LOADING OF THE CONSTANT POOL

When constant pool 244 is to be loaded into volatile memory at runtime, division record 344 is read to determine how much data from the constant pool 244 belongs to the first page (page 0). The size stored in division record 344 is 4090 bytes, so the first 4090 bytes of constant pool 244 are loaded into volatile memory as page 0. Thus, the first item in page 0 will be string 372 and the last item in page 0 will be the string before string 374.

Next, a second page (page number 1) is created by reading division record 346 to determine that page number 1 includes the next 15 bytes of data from constant pool 244. Finally, a third page (page number 2) is created by reading division record 348 to determine that page number 2 includes the next 5120 bytes of data from the constant pool 244. The next 5K of data from the constant pool 244 is then loaded as page number 2. Page number 2 therefore contains string 376. It is worth noting that during this process, no item within constant pool 244 is truncated or contained in more than one page.

STEPS FOR GENERATING PAGE DIVISION METADATA

Figure 4:
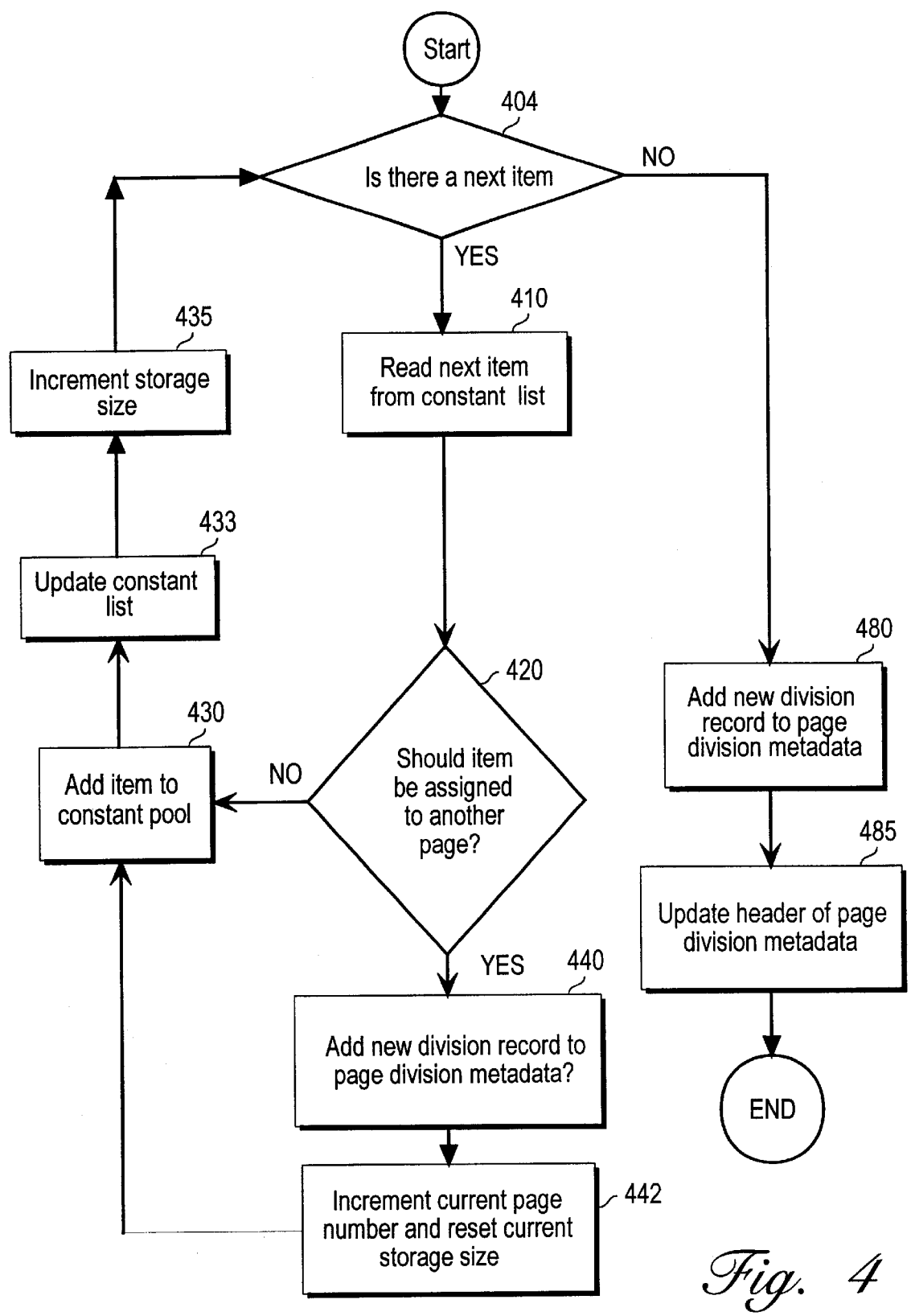
FIG. 4 is a flow chart showing the steps of a method for generating page division metadata.

As described above, page division metadata 248 is used during the runtime loading of the constant pool 244 to ensure that no item within constant pool 244 is split between memory pages. FIG. 4 is a flow chart showing the steps of a method for generating page division metadata that can be used to create pages that do not split items within a constant pool between pages.

The steps in FIG. 4 shall be explained with reference to compiler 220, the data structures shown in FIG. 3A, and table of constants 370 (FIG. 3B). In one embodiment of the invention, the steps shown in FIG. 4 are performed while generating program unit 240, and after the page metadata header 340, constant list 320, and intermediate byte code have been generated.

At this point, the item field 323 of constant list 320 will identify the items in the table of constants 370, but the page number field 324 and offset field 326 will be empty because the items have not yet been assigned to pages. In addition, the intermediate byte code contains unresolved references to items in the constant pool 244. An unresolved reference contains information identifying an item in the constant list 320 but does not contain the information required by the code executor 260 to access the item at runtime.

For illustrative purposes, it shall be assumed that the string "any string" is the string associated with the second constant list record 328 in constant list 320. An unresolved reference to string "any string" contains data that indicates that the string is the second string in the constant list 320, but contains no data indicating the location (page and offset) that string "any string" will be stored at during runtime. Code executor 260 needs this information to access the constant "any string" at runtime.

During execution of the steps shown in FIG. 4, a current page number and a current storage size is maintained. The current page number and current storage size are initially set to zero. The current page number and current storage size are updated in the manner described below. As items in the table of constants 370 are processed in an iterative manner, each is assigned to the page associated with the current page number. The current storage amount is incremented as each item is assigned to a page.

When assigning an item to a page would increase the current storage amount above a threshold ("base size"), and the item is not the first item in constant pool 244, a division record is created for the current page number and current storage size and then stored in the page division metadata 248. The current storage size is then reset to zero and the current page number is incremented. The item that would have caused the page to exceed the threshold is then assigned to the page associated with the new current page number value.

In FIG. 4, at step 404, a determination is made as to whether there is a next item to read from constant list 320. If there is a next item to read, control passes to step 410. Otherwise, all of the items in the constant list have been processed and control passes to step 480. In this example, string 372 (FIG. 3B) is the next item to read, thus control passes to step 410.

At step 410, the next item in the constant list 320 is read. The item that is read is referred to as the current item. The constant list record for the current item is referred to as the current constant list record. For the purpose of explanation, it shall be assumed that the items in constant list 320 are listed in the same order as they are shown in table of constants 370. Thus, the first item in constant list 320 will be string 372 (FIG. 3B). Data that identifies string 372 is read from record 322 (FIG. 3A) in constant list 320. String 372 thus becomes the current item and constant list record 322 becomes the current constant list record.

At step 420, it is determined whether to assign the current item to the current page. The current page is the page that will be associated with the current page number at runtime. If the sum of the size of the current item and the current storage size does not exceed the base size, then the current item should be assigned to the current page and control flows to step 430. Otherwise, control flows to step 440.

In this example, the cumulative storage size is 0 because string 372 (FIG. 3B) represents the first item read. For illustrative purposes, the base size is 4096 bytes. Because the sum of the current storage size (0) and the size of a thirteen byte string 372 is less than 4096 bytes, control flows to step 430.

At step 430, the item is stored in the constant pool 244 of program unit 240. At step 433, the constant list record for the current item is updated. The page number field is updated to the current page number, and the offset field is set to the current storage size. At step 435, the current storage size is then increased by the size of the current item. Control then flows to step 404, where it is determined whether there is a next item to read.

In this example, at step 430, string 372 (FIG. 3B) is stored in constant pool 244 (FIG. 3A). At step 433, the current page number is zero because string 372 is the first item read. In constant list record 322 (FIG. 3A), the page number field 324 is updated to zero. Offset field 326 is updated to zero as well. At step 435, the current storage size is then increased by the size of the current item. The size of the current item is 13 bytes and the current storage size is zero, so the current storage size is 13 bytes after the current storage size is increased. Control then flows to step 404.

For purposes of illustration, the loop represented by steps 404, 410, 420, 430, 433, and 435 are executed repeatedly as long as the sum of the current item size and the current storage size does not exceed the base size. During this loop, page and offset numbers are determined for the items read at step 410, and the items are stored in constant pool 244 (FIG. 3A) in the manner previously described.

After iterating through the items between string 372 and string 374, at step 410 string 374 is read. For the purposes of explanation, it shall be assumed that at the time string 374 is read, the current storage size is 4090. At step 420, the determination is that the current item cannot be assigned to the current page because adding the size of the item to the current storage size exceeds the base size. Thus, control flows to step 440.

At step 440, a new division record is added to the page division metadata 248. The division record contains data representing a division size equal to the current storage size (i.e. the size without the current item). Then at step 442, the current page number is incremented and the current storage size reset to zero. Control then flows to step 430.

In this example, a new division record, division record 344, is added to the page division metadata 248. The page size stored in the division record is 4090 and the page number associated with the division record 344 is zero. At step 442, the current page number is incremented to one, and the current storage size is reset to zero. Control flows to step 430. Steps 430, 433, and 435 are performed for string 374 in a manner similar to that previously described for string 372.

At step 410, the item represented by string 376 is read. At this point, the current storage size is fifteen because string 374 is 15 bytes long and has already been assigned to the current page. The size of string 376 is 5K, and thus the determination at step 429 is that the addition of string 376 to the page would exceed the base size. Therefore, control flows to step 440. At step 440, in the manner previously described, a new division record 346 is added to the page division metadata.

The steps 442, 430, 433 and 435 are then performed in the manner previously described. During the next iteration of step 404, it is determined there is no next item to read. Thus, all of the items in the constant list 320 have been read. Control flows to step 480.

At step 480, a new division record 348 is added to the page division metadata 248, in the manner similar to that previously described. In this example, page division record 348 is added to page metadata 248. Page division record 348 is associated with page 2 and stores a page size of 5K. Control then passes to step 485.

At step 485, the page division metadata header is updated to reflect the number of division size records in the division size metadata. In this example, the page division metadata header is updated to three, the number of division records created.

At the completion of the process illustrated in FIG. 4, division record 344 (FIG. 3A) represents a page (page number 0) that at runtime contains string 372 (FIG. 3B) and strings between string 372 and string 374 in constant list 320. Division record 346 represents a page (page number 1) that at runtime contains string 374, and division record 348 represents a page (page number 2) that at runtime contains string 376. The values of the division size for division records 344, 346, and 348 are 4090, 15, and 5120 respectively.

As shall be explained in greater detail, the size of the page into which the items associated with a particular division record are stored is based on the division size within the particular division record. It is worth noting that the division size varies, and that the division size is at least as large as any item associated with the division record.

RESOLVING REFERENCES

Before generation of the program unit 240 is considered complete, the unresolved references to the constant pool items within the byte code 242 must be resolved. Specifically, the references within the byte code 242 must be transformed into "resolved references" that can be used to find the referenced items at runtime. Resolving references is the process of updating unresolved references so that they contain the data required by the code executor 260 to locate the referred to item at runtime.

According to one embodiment, the format of a resolved reference is:

<reference page number><reference offset>

For a given reference to an item, the <reference page number> is the page number of the page containing the item, and the <reference offset> is data indicating where in the page the respective item is stored.

In resolving each unresolved reference to a constant pool item, code compiler 220 finds the constant list record associated with the item, and updates unresolved references with the page number field and offset field contained in the constant list record.

PAGE MAPPING TABLE

At runtime, code executor 260 receives a request to load program unit 240. A load request is generated when, for example, software running on computer system 102 invokes a routine in program unit 240. In response to receiving the load request, code executor 260 divides and loads items from constant pool 244 into pages and generates a page mapping table.

Figure 5:
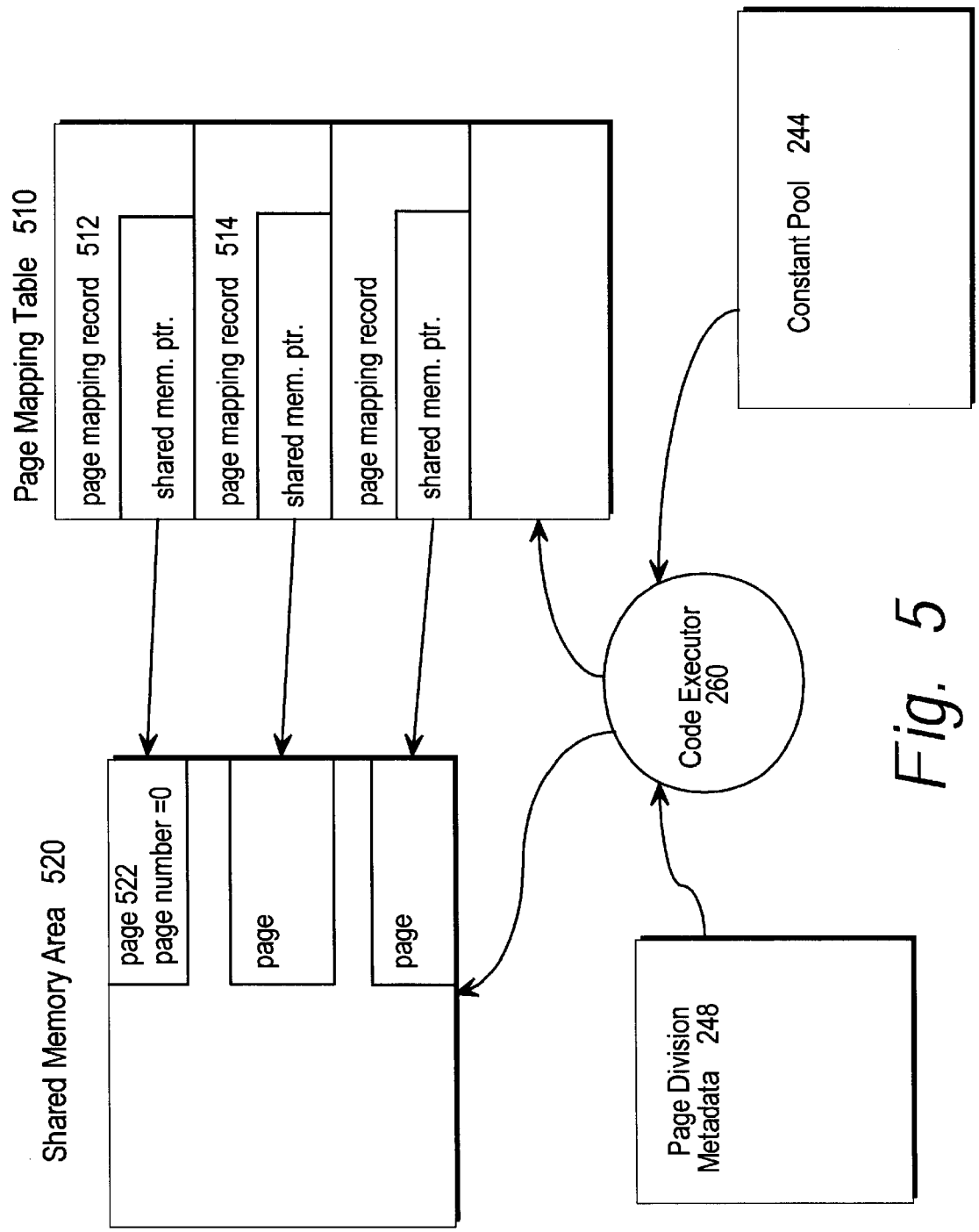
FIG. 5 is a block diagram showing an exemplary code executor, page mapping table, pages in a shared memory area, and other data structures used by code executor.

FIG. 5 shows a page mapping table 510, and data structures used to generate page mapping table 510, including page division metadata 248 and constant pool 244. A page mapping, such as page mapping table 510, contains data indicating the storage location of a page containing data associated with a particular program unit.

In one embodiment of the invention, a separate page mapping table is associated with the constant pool of each program unit that is loaded into volatile memory. Page mapping table 510 is stored in the shared memory area 520. Page mapping table 510 contains a sequence of one or more page mapping records. Each page mapping record is associated with a page and contains a shared memory pointer to the associated page. The shared memory pointer points to the respective page's storage location within shared memory area 270.

A page mapping record is associated with the page number. According to one embodiment, the page number associated with a page mapping record corresponds to the page mapping record's sequential position within the sequence of one or more page mapping records. Each page mapping record corresponds to a page, and indicates the storage location of the page to which it corresponds. For example, the page mapping record 512, having a sequential position of zero, is associated with the page having a page number zero, which is page 522. Thus, page 522 is stored at the storage location indicated by shared memory pointer of page mapping record 512.

GENERATING PAGES AND PAGE MAPPING

Figure 6:
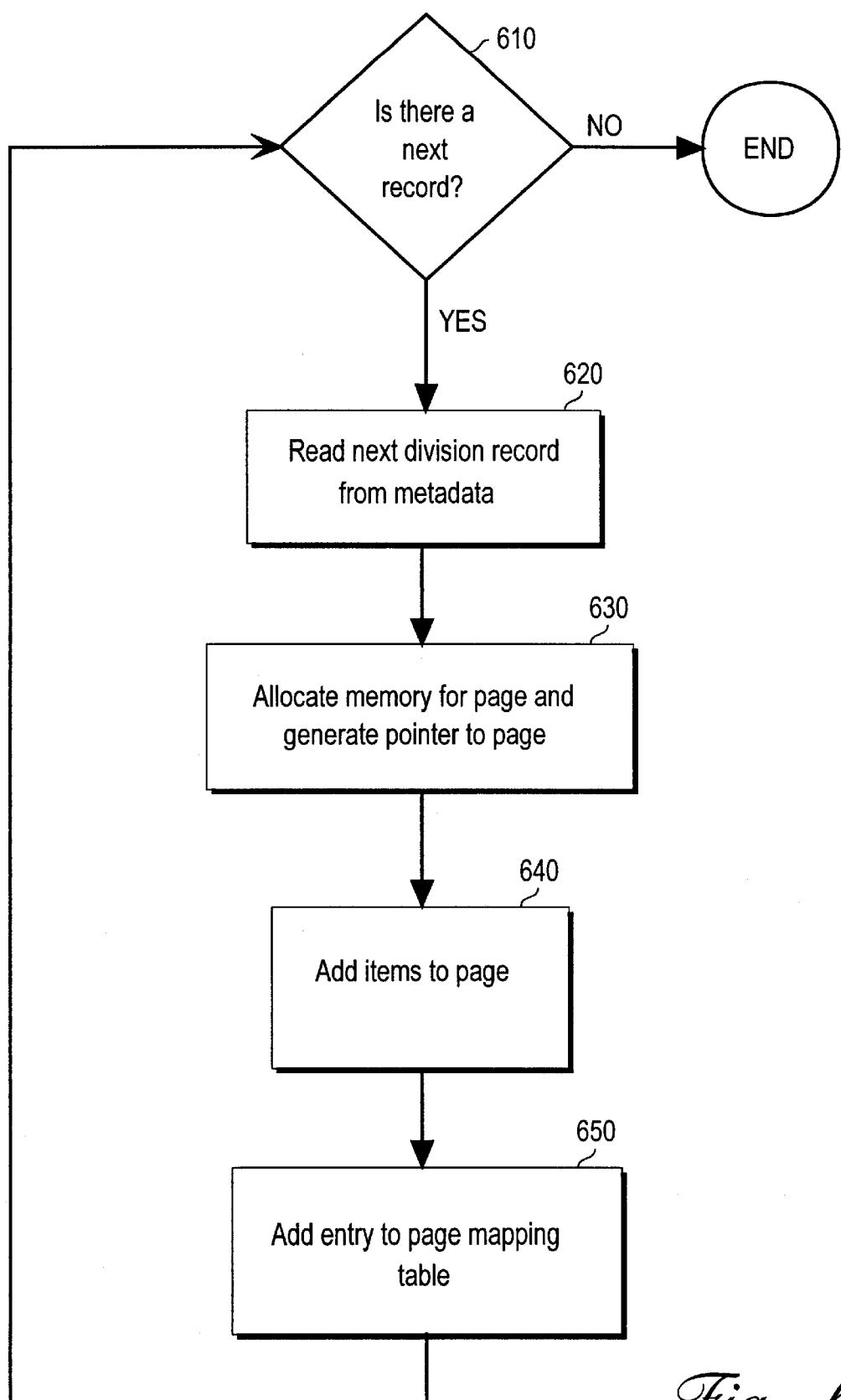
FIG. 6 is a flow chart showing the steps of a method for generating a page mapping.

FIG. 6 shows the steps of a method for generating (1) pages for a program unit and (2) a page mapping for the pages. The steps are illustrated with reference to code executor 210, the data structures shown in FIG. 5, table of constants 370 (FIG. 3B), and page division metadata 248 (FIG. 3B), which are used as an example to illustrate the steps shown in FIG. 4. For purposes of illustration, the example presented for illustrating the steps shown in FIG. 3 is continued.

Steps 610, 620, 630, 640, and 650 represent a loop that is performed for each division record in the page division metadata. The division records are read in sequential order from the page division metadata, until the last division record has been read and the loop has been performed for the last division record.

At step 610, it is determined whether there is "next" division record to read from the page division metadata. During the first iteration, the first division record in the page division metadata is the "next" division record. If the last division record has been read, then there is no record to read, and execution of the steps ends. Otherwise, control passes to step 630. In this example, because no record has been read, it is determined that there is a division record to read. Therefore, control passes to step 630.

At step 620, the division record is read from the page division metadata. The division record read is referred to as the current division record. The division size indicated by the current division record is referred to as the current division size. In this example, the division record 344 (FIG. 3A) is read. Thus, the current division record becomes division record 344 and the current division size becomes 4090.

At step 630, memory from the shared memory area is allocated for the page associated with the current division record ("current page") and a pointer to the page is generated. The memory is allocated and a pointer generated using techniques well known to those skilled in the art, which include invoking a memory allocator function. Depending on the memory management system being used, the amount of memory allocated may be equal to the current division size, or greater. Some memory management systems, for example, may allocate a minimum amount to increase the uniformity of allocations of memory for purposes of efficiency. In this example, the current division size is 4090. 4090 bytes are allocated for page 522 (page number=0). A shared memory pointer is generated that points to the memory allocated for the page.

At step 640, items are read from constant pool 244 and stored in the memory allocated for the current page. The amount of data read corresponds to the division size field of the current division record. As mentioned earlier, reading an amount of data from the constant pool in accordance with the size indicated by each division record in the sequential order of the division records results in pages in which no item is truncated or stored in more than one page. In this example, 4090 bytes of data constant pool 244 (FIG. 5) are read and stored in page number 0.

At step 650, a page mapping record is added to the page mapping table. The shared memory pointer of the page mapping record is set to the pointer generated at step 630. Control then passes to step 610, where performance of the loop continues until the loop is performed for the last division record in the page division metadata.

ACCESSING CONSTANT POOL ITEMS

When executing byte code 242 from program unit 244, code executor 260 encounters instructions requiring access to a specified item in constant pool 244. When such instructions are encountered, a request to access the specified item is generated. Such requests include a reference ("request reference") to the specified item.

To access the specified item, it must first be located. Locating an item begins by examining the page mapping table to determine the storage location of the page containing the specified item. The storage location of the page containing the specified item is the storage location mapped to the reference page number in the request reference. Once the storage location of the page is determined, the item is read beginning at the location within the page indicated by the offset.

For purposes of illustration, a reference to string a_string contains a reference page number of zero and an offset of 4079 (representing 4079 bytes). Page number zero corresponds to the first page mapping record (page mapping record 512) in the page table mapping 510. The shared memory pointer of page mapping record 512 points to the storage location in shared memory area 520 where page 522 resides. The first character of a_string is located at a location indicated by the reference offset, which is the $4080^{th}$ byte in page 522.

In an embodiment of the invention, a pointer to an item can be generated from the following code expression (which is represented in code resembling the C programming language):

*(DS+page_number * X)+item_offset;

DS represents a pointer to page mapping table 510, page_number represents a page number of a reference, X is the fixed size of a page mapping record, and item_offset represents an offset of a reference. Type casting issues in the above expression are ignored. *(DS+page_number * X) is an expression which results in a pointer to the storage location of the concerned page. Adding this to item_offset results in pointer to the sought item.

Note that when using the above equation to obtain the memory storage location of any item, the number of operations required to determine the memory location remains constant as the number of items and pages varies or increases. When the set of operations required to perform a task or function is constant, that task or function is referred to as being performed in "constant-time".

PAGING THE PAGE MAPPING TABLE

Figure 7:
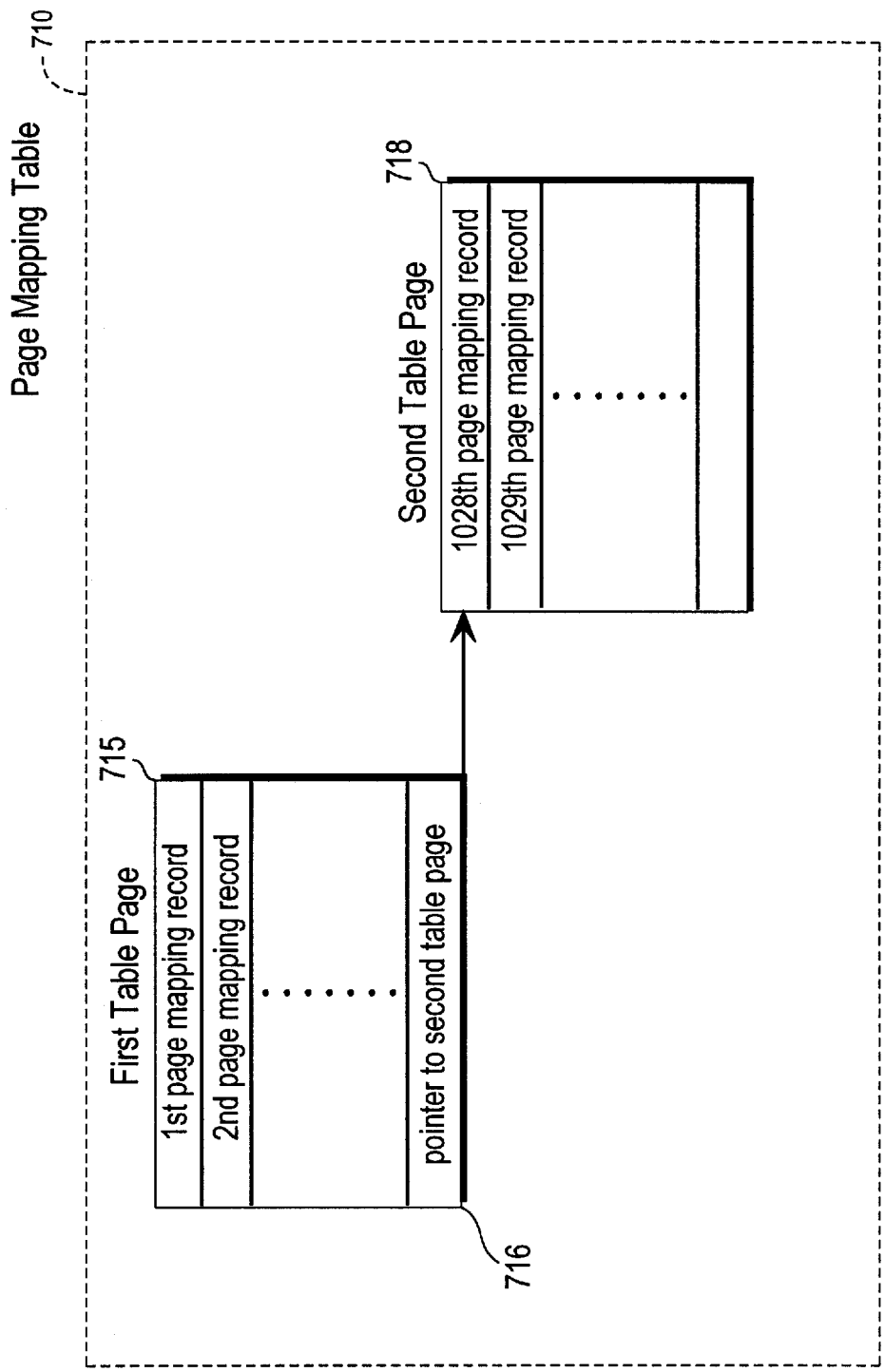
FIG. 7 is a block diagram showing a page mapping table in another embodiment of the invention.

In an embodiment of the invention, a page mapping includes a page mapping table that is divided into pages, herein referred to as table pages. FIG. 7 shows a page mapping table 710, which includes a chain (i.e. linked list) of table pages like table page 715 and table page 718. Each table page contains page mapping records. The number of table pages in a chain of table pages varies and expands as necessary to accommodate the number of page mapping records required for a given program unit.

A table page is associated with a maximum number of entries. Except for the final table page in a chain of table pages, the last entry in the table page is a link (e.g. pointer) to the next table page in the chain. Thus, the maximum number of page mapping records that are contained in a table page is the maximum number of entries minus one. For example, in FIG. 7, the maximum number of entries that may be contained in a table page is 1028, and page mapping table 710 contains 1060 page mapping records. Table page 715 contains 1027 page mapping records. The $1028^{th}$, table entry 716, is a pointer to table page 718. Table page 718 contains the remainder of page mapping records. To locate an item based on the reference page number and a reference page offset associated with the item, first the page number of the table page containing the item is determined (e.g. by dividing the reference page number by the maximum number of page mapping records in a table page and then adding one). Next, the sequential position of the page mapping record within the page associated with the page number is determined by, for example, performing a modulo operation (i.e. using the remainder from the previous division). Finally, the chain of table pages is traversed like any linked list to get the page mapping record at the previously determined sequential position.

For example, assume that a request to access an item includes a reference having a reference page number of 1060. First, it is determined that the second (i.e. 1060/1027+1=2) table page (table page 718 in FIG. 7) contains the page mapping record associated with the reference page number 1060, and that the thirty third (i.e. 1060 modulo 1027)=33) page mapping record is the sought page mapping record. Next, table page record 716 is accessed to get the pointer to table page 718, and then the thirty third page mapping record is accessed to get a shared memory pointer to the page associated with sought item. Then, the reference page offset is added to this shared memory pointer, thereby providing a pointer to the desired item.

In other embodiments of the present invention, it may be unnecessary to store a link in a table page to the next table page. Another data structure, such as an array of pointers to table pages (e.g. a page table for pages of the page mapping table) can be used to locate the table pages.

One advantage to using table pages occurs when there are program units with such a large number of associated items that page mappings required by the program units are also large. Paging such page mapping tables reduces the negative impact on performance arising from fragmentation of the shared memory for the same reasons discussed earlier with respect to paging constant pools, because large page mappings no longer have to be loaded into a single contiguous area of the shared memory.

DETERMINING PAGE DIVISIONS AT LOAD TIME

In one embodiment of the invention, the boundaries between the pages that store items from the constant pool of a program unit are determined at load time. However, metadata that enables the efficient determination of the boundaries between pages is generated when the program unit is compiled.

Generating such metadata may, for example, include adding a size-indicating prefix to each item and then storing the prefixed items in the constant pool associated with the program unit. At load time, when an item is being read from a constant pool in a program unit and placed in a page, the prefix enables a relatively quick determination of the size of the item, and, consequently the boundary between that item and the next. This information is used to ensure that a single item does not span page boundaries.

However, because the particular page to which an item is assigned is not known at compile time, the references are resolved in a different manner than previously described. Unresolved references are resolved at the time of compiling the corresponding program unit by updating a reference index value that is stored in a reference to an item. The reference index value corresponds to the referred to item's order in the constant pool. For example, a reference index value of 1 corresponds to the second item in the constant pool, a value of 2 to the third item, and so forth. Updating the reference index of an unresolved reference with the referred to item's order in the constant pool resolves the reference because the reference index value can be used to locate (in conjunction with the page mapping that is formed when loading the program unit) the respective item.

In one embodiment of the invention, the page mapping includes a set of records with two fields, an index range and a shared memory pointer. For each record, the index range is the range encompassing the index numbers of the set of items in the page pointed to by the shared memory pointer. The range of indexes associated with a page does not overlap the range of indexes associated with any other page.

The page mapping is generated at load time in conjunction with iteratively reading the items from the constant pool, allocating memory for pages, and storing the items in pages. For example, items are read from the constant pool, a cumulative storage size and current page are calculated and maintained, and items assigned to page in a manner similar to that described in FIG. 4. In addition, when an item is read whose size, when added to the current storage size, would cause a base size to be exceeded, memory is allocated for the current page. The items assigned to the current page are then stored in the memory allocated to the current page. Next, the current page is incremented, the current storage size is reset, and the item just read from the constant pool is assigned to the current page. Then the next item, if any, is read from the constant pool.

To locate an item based on a reference index in a reference referring to the item, the record with the index range covering the reference index is found. The shared memory pointer is read from the found record, and used to access the page containing the item. Next, the item's order within the page can be determined based on the reference index and the beginning of the range associated with the page. Based on this determination, the sought after item is read from the page.

For example, assume the request for an item includes a reference having a reference index value of 101. The page mapping is scanned for the record with an index range covering 101, which in this example is a record with an index range of value 100–159. Once this record is found, the shared memory pointer in it is used to access the page containing the item. Because the index range begins with an item associated with index value of 100, the sought after item is the second item in the page. Next, the second item in the page is read, using the size prefixes to determine where one item ends and the next begins.

While the present invention is illustrated by way of example with respect to dividing a constant pool into pages, the present invention is applicable to dividing other kinds of sets of items into pages. Therefore, it is understood, that present invention is not limited to dividing a constant pool.

Furthermore, the present invention is not limited to dividing a shared memory area. For example, a memory area exclusively assigned to a process can become fragmented as a result of repeated allocation and de-allocation of the exclusively assigned memory area by the process. Such fragmentation could be alleviated through the application of the methods for paging described herein. Therefore, it is understood that the present invention is not limited to dividing a shared memory area.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining the division of a set of items into a plurality of pages, said set of items being associated with a program unit, the method including the steps of:
   when the program unit is compiled, generating metadata that indicates the division of said set of items into a plurality of pages, wherein said set of items includes a plurality of items and no item of said plurality of items spans two or more pages of said plurality of pages; and
   storing said metadata for use when said program unit is executed; and
   wherein the program unit includes one or more routines, instructions for executing said one or more routines, and data related to the execution of the one or more routines.

2. The method of claim 1, wherein the step of generating metadata includes generating metadata that indicates a division of said set of items into at least a first page that has a first size and a second page that has a second size, wherein said first size is different than said second size.

3. The method of claim 1, wherein the step of generating metadata includes the steps of:
   A) assigning a first item from said set of items to a first page from said plurality of pages;
   B) determining whether assigning a next item to said first page would cause said first page to exceed a base size; and C) if assigning said next item to said first page would not cause said first page to exceed said base size, then assigning said next item to said first page.

4. The method of claim 3, further including the step of repeating steps B) and C) until assigning said next item to said first page would cause said first page to exceed said base size.

5. The method of claim 3, further including the step of assigning said next item to a second page of said plurality of pages if assigning said next item to said first page would cause said first page to exceed said base size.

6. The method of claim 5, wherein:
said next item is larger than said base size; and
the step of assigning said next item to a second page includes the step of assigning said next item to a second page that is larger than said base size.

7. The method of claim 1, wherein the step of generating metadata includes the step of generating division size records, each division size record:
being associated with a page from said plurality of pages, and
containing data indicating an amount of memory to allocate to the page associated with the record.

8. The method of claim 1, further including the step of generating references, based on said metadata, to at least one of said plurality of items within said set of items.

9. The method of claim 1, further including the steps of:
compiling said program unit to generate program code; and
during generation of said program code, generating a particular reference to a particular item, the particular reference containing:
data identifying a particular page of said plurality of pages in which said particular item is stored, wherein said particular item is stored at a particular location within said particular page, and
data indicating the particular location within said particular page.

10. A method for accessing, in volatile memory, items from a set of items associated with a program unit, the method including the steps of:
when said program unit is loaded for execution, loading the set of items into a plurality of pages, wherein boundaries between said plurality of pages are indicated by metadata that is generated when said program unit is compiled, such that no item of said plurality of items is split between two or more of said plurality of pages;
receiving a request to access a first item of said set of items; and
locating said first item in one of said plurality of pages; and
wherein the program unit includes one or more routines, instructions for executing said one or more routines, and data related to the execution of the one or more routines.

11. The method of claim 10, further including the step of generating a page mapping based on said metadata when said compiled version of said program unit is loaded for execution, wherein said page mapping contains one or more page mapping records, and each of said page mapping records is associated with a respective page from said plurality of pages, and contains data indicating a storage location of the page associated with the page mapping record.

12. The method of claim 10, wherein the step of loading the set of items into a plurality of pages includes loading the set of items into a plurality of pages wherein each page of said plurality of pages is a contiguous region of memory with respect to a virtual address space.

13. The method of claim 10, wherein the step of loading the set of items includes loading the set of items into a plurality of pages that includes a first page having a first size and a second page having a second size, wherein said first size differs from said second size.

14. The method of claim 11, wherein:
the step of receiving a request to access a first item includes receiving a reference to the first item; and
the step of locating said first item includes locating said first item based on said page mapping and said reference.

15. The method of claim 14, wherein:
said first item is stored at a storage location within a first page; and
the step of receiving a reference includes receiving a page number and an offset, wherein:
said page number is associated with said first page, and
said offset indicates the storage location of said first item within said first page.

16. The method of claim 11, wherein said page mapping is divided into one or more table pages.

17. A method for accessing, in volatile memory, items from a set of items associated with a program unit, the method including the steps of:
when said program unit is loaded for execution, generating a page mapping based on metadata, wherein
said metadata indicates an item size for each of said plurality of items, and
said page mapping indicates a division of said set of items into a plurality of pages, wherein no item of said plurality of items spans two or more pages of said plurality of pages;
receiving a request to access a first item of said set of items; and
locating said first item based on said page mapping; and
wherein the program unit includes one or more routines, instructions for executing said one or more routines, and data related to the execution of the one or more routines.

18. The method of claim 17, wherein the step of generating a page mapping includes generating data that maps a particular set of one or more items from said set of items to a particular page.

19. The method of claim 18, wherein the step of generating data that maps a particular set of one or more items includes generating data that maps a range of index numbers associated with said particular set of one or more items to said particular page.

20. The method of claim 17, wherein the step of generating a page mapping includes generating a page mapping that indicates a division of said set of items into a plurality of pages that include a first page having a first size and a second page having a second size, wherein said first size differs from said second size.

21. A computer-readable medium carrying one or more sequences of one or more instructions for determining the division of a set of items into a plurality of pages, said set of items being associated with a program unit, wherein the execution of the one or more sequences of the one or more instructions causes the one or more processors to perform the steps of:

when the program unit is compiled, generating metadata that indicates the division of said set of items into a plurality of pages, wherein said set of items includes a plurality of items and no item of said plurality of items spans two or more pages of said plurality of pages; and storing said metadata for use when said program unit is executed; and wherein the program unit includes one or more routines, instructions for executing said one or more routines, and data related to the execution of the one or more routines.

22. The computer-readable medium of claim 21, wherein the step of generating metadata includes generating metadata that indicates a division of said set of items into at least a first page that has a first size and a second page that has a second size, wherein said first size is different than said second size.

23. The computer-readable medium of claim 21, wherein the step of generating metadata includes the steps of:

A) assigning a first item from said set of items to a first page from said plurality of pages;

B) determining whether assigning a next item to said first page would cause said first page to exceed a base size; and C) if assigning said next item to said first page would not cause said first page to exceed said base size, then assigning said next item to said first page.

24. The computer-readable medium of claim 23, further including sequences of instructions for performing the step of repeating steps B) and C) until assigning said next item to said first page would cause said first page to exceed said base size.

25. The computer-readable medium of claim 23, further including sequences of instructions for performing the step of assigning said next item to a second page of said plurality of pages if assigning said next item to said first page would cause said first page to exceed said base size.

26. The computer-readable medium of claim 25, wherein:

said next item is larger than said base size; and the step of assigning said next item to a second page includes the step of assigning said next item to a second page that is larger than said base size.

27. The computer-readable medium of claim 21, wherein the step of generating metadata includes the step of generating division size records, each division size record:

being associated with a page from said plurality of pages, and containing data indicating an amount of memory to allocate to the page associated with the record.

28. The computer-readable medium of claim 21, further including sequences of instructions for performing the step of generating references, based on said metadata, to at least one of said plurality of items within said set of items.

29. The computer-readable medium of claim 21, further including sequences of instructions for performing the steps of:

compiling said program unit to generate program code; and during generation of said program code, generating a particular reference to a particular item, the particular reference containing:

data identifying a particular page of said plurality of pages in which said particular item is stored, wherein said particular item is stored at a particular location within said particular page, and data indicating the particular location within said particular page.

30. A computer-readable medium carrying one or more sequences of one or more instructions for accessing, in volatile memory, items from a set of items associated with a program unit, wherein the execution of the one or more sequences of the one or more instructions causes the one or more processors to perform the steps of:

when said program unit is loaded for execution, loading the set of items into a plurality of pages, wherein boundaries between said plurality of pages are indicated by metadata that is generated when said program unit is compiled, such that no item of said plurality of items is split between two or more of said plurality of pages; and receiving a request to access a first item of said set of items; and locating said first item in one of said plurality of pages; and wherein the program unit includes one or more routines, instructions for executing said one or more routines, and data related to the execution of the one or more routines.

31. The computer-readable medium of claim 30, further including sequences of instructions for performing the step of generating a page mapping based on said metadata when said compiled version of said program unit is loaded for execution, wherein said page mapping contains one or more page mapping records, and each of said page mapping records is associated with a respective page from said plurality of pages, and contains data indicating a storage location of the page associated with the page mapping record.

32. The computer-readable medium of claim 30, wherein the step of loading the set of items into a plurality of pages includes loading the set of items into a plurality of pages wherein each page of said plurality of pages is a contiguous region of memory with respect to a virtual address space.

33. The computer-readable medium of claim 30, wherein the step of loading the set of items includes loading the set of items into a plurality of pages that includes a first page having a first size and a second page having a second size, wherein said first size differs from said second size.

34. The computer-readable medium of claim 31, wherein:

the step of receiving a request to access a first item includes receiving a reference to the first item; and the step of locating said first item includes locating said first item based on said page mapping and said reference.

35. The computer-readable medium of claim 34, wherein:

said first item is stored at a storage location within a first page; and the step of receiving a reference includes receiving a page number and an offset, wherein:

said page number is associated with said first page, and said offset indicates the storage location of said first item within said first page.

36. A computer-readable medium carrying one or more sequences of one or more instructions for accessing, volatile memory, items from a set of items associated with a program unit, wherein the execution of the one or more sequences of the one or more instructions causes the one or more processors to perform the steps of:

when said program unit is loaded for execution, generating a page mapping based on metadata, wherein:

said metadata indicates an item size for each of said plurality of items, and said page mapping indicates a division of said set of items into a plurality of pages, wherein no item of said plurality of items spans two or more pages of said plurality of pages;

receiving a request to access a first item from said set of items; and locating said first item based on said page mapping; and wherein the program unit includes one or more routines, instructions for executing said one or more routines, and data related to the execution of the one or more routines.

37. The computer-readable medium of claim 36, wherein the step of generating a page mapping includes generating data that maps a particular set of one or more items from said set of items to a particular page.

38. The computer-readable medium of claim 37, wherein the step of generating data that maps a particular set of one or more items includes generating data that maps a range of index numbers associated with said particular set of one or more items to said particular page.

39. The computer-readable medium of claim 36, wherein the step of generating a page mapping includes generating a page mapping that indicates a division of said set of items into a plurality of pages that include a first page having a first size and a second page having a second size, wherein said first size differs from said second size.

40. The computer-readable medium of claim 31, wherein said page mapping is divided into one or more table pages.

* * * * *